United States Patent
Ohiwa et al.

(10) Patent No.: US 6,710,504 B2
(45) Date of Patent: Mar. 23, 2004

(54) BRUSHLESS DC MOTOR

(75) Inventors: Shoji Ohiwa, Gunma (JP); Kazuo Ohnishi, Gunma (JP); Yoichi Nagata, Gunma (JP); Junichi Ikeda, Gunma (JP); Tomokazu Uchiyama, Gunma (JP); Kouji Yoneda, Gunma (JP); Hideo Saito, Gunma (JP); Masahiro Mimura, Ibaragi (JP)

(73) Assignee: Japan Servo Co., Ltd., Tokyo (JP)

( * ) Notice: Subject to any disclaimer, the term of this patent is extended or adjusted under 35 U.S.C. 154(b) by 0 days.

(21) Appl. No.: 10/245,806

(22) Filed: Sep. 17, 2002

(65) Prior Publication Data

US 2003/0057799 A1 Mar. 27, 2003

(30) Foreign Application Priority Data

| Sep. 26, 2001 | (JP) | 2001-293264 |
| May 30, 2002 | (JP) | 2002-158064 |
| May 30, 2002 | (JP) | 2002-158065 |
| May 30, 2002 | (JP) | 2002-158066 |

(51) Int. Cl.$^7$ ................................................. H02K 1/12
(52) U.S. Cl. ................. 310/257; 310/49 A; 310/DIG. 6
(58) Field of Search ...................... 310/257, 254, 310/258, 259, DIG. 6, 49 R, 49 A, 164, 194, 208

(56) References Cited

U.S. PATENT DOCUMENTS 5,361,011 A * 11/1994 York .......................... 310/194
5,952,760 A * 9/1999 Miyazawa et al. .......... 310/194
5,986,379 A * 11/1999 Hollenbeck et al. ........ 310/257
6,005,320 A * 12/1999 Kim et al. ............. 310/156.36
6,222,286 B1 * 4/2001 Watanabe et al. ......... 310/49 R

FOREIGN PATENT DOCUMENTS

| JP | 58063065 | * | 4/1983 |
| JP | 61214759 | * | 9/1986 |
| JP | 153486/1986 | * | 9/1986 |
| JP | 01023754 | * | 1/1989 |
| JP | 06303750 | * | 10/1994 |

* cited by examiner

Primary Examiner—Dang Le
(74) Attorney, Agent, or Firm—Boyle Fredrickson Newholm Stein & Gratz S.C.

(57) ABSTRACT

A brushless DC motor wherein a rotor has a motor shaft, a rotor yoke mounted on the motor shaft, and a ring-shaped magnet magnetized so as to have a plurality of magnet poles in the circumferential direction thereof, and held by the rotor yoke. A stator has first and second stator yokes each having main magnetic poles extending in the radial direction from the center thereof, magnetic pole pieces extending in the vertical direction from tip ends of the main magnetic poles along an inner peripheral surface of the ring-shaped magnet, a center yoke surrounding the motor shaft for connecting magnetically said first and second stator yokes, a winding assembly having an annular winding, and a printed wiring board, on which the annular winding, a electromagnetic conversion element and a driving circuit are mounted.

6 Claims, 9 Drawing Sheets

BRUSHLESS DC MOTOR

BACKGROUND OF THE INVENTION

1. Field of the Invention

This invention relates to a brushless DC motor having a magnet magnetized so as to have a plurality of magnet poles in the circumferential direction thereof for use in a small fun•blower and, more particularly, relates to a brushless DC motor comprising two stator yokes, each having main magnetic pole and magnetic pole pieces, a center yoke passing through the center portions of the two stator yokes for connecting magnetically the two stator yokes, and an annular winding arranged between the two stator yokes.

2. Description of the Prior Art

Japanese Utility Model Laid-Open No. 153486/86, Japanese Patent Laid-Open No. 63065/83, Japanese Patent Laid-Open No. 214759/86, Japanese Patent Laid-Open No. 23754/89, and Japanese Patent Laid-Open No. 303750/94 propose many kinds of the brushless DC motor.

FIG. 8 is an exploded view of the conventional brushless DC motor disclosed in the Japanese Patent Laid-Open No. 23754/89. FIG. 9 shows a relation between the magnet and the stator yokes. FIG. 10 is a sectional view of the conventional brushless DC motor.

The brushless DC motor of four poles shown in FIG. 8 has a rotor 1 consisting of a cylindrical rotor yoke 2 of the magnetic material, a magnet 3 magnetized so as to have a plurality of magnet poles in the circumferential direction thereof, and a motor shaft 4. Reference numeral 5 denotes a first stator yoke having two main magnetic poles 13 and magnetic pole pieces 21. Reference numeral 23 denotes a bobbin, 24 denotes an annular winding wound around the bobbin 23. Reference numeral 25 denotes terminals mounted on the bobbin 23, to each of the terminals 25 each of lead wires of the winding 24 being tied up and soldered, 6 denotes a second stator yoke having two main magnetic poles 14 and magnetic pole pieces 22. Reference numeral 7 denotes cylindrical center yokes formed on center portions of the first and second stator yokes 5 and 6, inserted telescopically each other so as to connect magnetically the first and second stator yokes 5 and 6 each other, 17 denotes a slit formed axially on each of the center yokes 7, 9 denotes an electromagnetic conversion element, such as a Hall element for detecting the magnet pole of the magnet 3, 11 denotes a printed wiring board for connecting electrically the Hall element 9 and the terminals 25 to a driving circuit.

FIG. 11 shows a driving circuit for two-phase half-wave electric currents energizing alternately two windings 24a and 24b having a phase difference of 180° in electrical angle. In FIG. 11, reference numeral 60 denotes a motor portion, 61 and 62 denote transistors each driven by a signal from a motor driving IC 63, 64 denotes a DC power source, and 65 denotes electric parts or IC parts installed on the printing wiring board 11.

In the Japanese Patent Laid-Open No. 23754/89, on page 4, lines 30–38 and in FIG. 3 thereof, a figure and an arrangement of magnetic pole pieces of first and second stator yokes are disclosed, as shown in FIG. 9 of the present application.

The motor shown in FIG. 9, however, has a dead point at which the motor cannot be driven in principle due to the specific arrangement of the magnet and the magnetic pole pieces. In order to avoid such dead point and to reduce a torque ripple during the rotation of the motor, a relative position of the magnet and the magnetic pole pieces is considered.

Specifically, it is stated in the prior art that it is preferable to reduce a spread angle a of the magnetic pole piece to ⅕ to ⅘ of that of one magnet pole of the magnet 3, and to set a spread angle b formed between the center lines of the magnetic pole pieces 21 and 22 of the first and second stator yokes 5 and 6 to $\pi/4$ to $3\pi/4$ in electrical angle.

Further, it is suggested in the publication that it is preferable for a high speed brushless DC motor to provide a slit 17 in the axial direction in each of the center yokes 7, in order to reduce the eddy current and the eddy current loss produced by the magnetic flux in the axial direction.

In the Japanese Patent Laid-Open No. 303750/94, on page 3, line 34 to page 4, line 12, it is pointed out that the sum of the current torque and the cogging torque becomes the motor torque, and there is a problem in the negative torque and the ripple of the motor torque, and proposed that the spread angles a and c of the magnetic pole pieces of the first and second stator yokes shown in FIG. 9 of the present application are different from each other. Further, in the Japanese Patent Laid-Open No. 63065/83, it is suggested that a projecting portion 20 is provided on each of magnetic pole pieces of the first and second stator yokes so as to project in a direction reverse to the rotary direction of the magnet different from the above prior art, as shown in FIG. 12 of the present application.

However, in the conventional motor as mentioned above has following defects.

In the conventional brushless DC motor disclosed in the Japanese Patent Laid-Open No. 23754/89, the winding 24 is wound around the bobbin 23, the lead wires of the winding 24 are tied up and soldered to the terminals 25 mounted on the printed wiring board 11, as shown in FIG. 8 of the present application. In such structure, the cost for the parts, such as the bobbin 23 and the terminals 25 is increased. Further, the treatment of the lead wires of the winding and the soldering thereof are complicated and the cost thereof is increased.

Further, in the above brushless DC motor, it is necessary to use the IC driving circuit for driving the two-phase bifilar windings 24a and 24b having a phase difference of 180° in electrical angle. The space factor of the winding 24 is reduced remarkably because two wires are jumbled together when the bifilar winding is wound around the bobbin.

Further, the magnetic flux from the magnet cannot be used effectively, because the space angles of the first and second stator yokes are different from each other and thus the spread angle a of the magnetic pole piece becomes small with respect to that of the one magnet pole of the magnet. Further, in the arrangement shown in FIG. 9, a magnetic flux from the N pole of the magnet 3 is returned to the S pole of the magnet 3 through the first stator yoke 5, the center yokes 7 and the second stator yoke 6. However, the magnetic flux from the N pole to the S pole of the magnet 3 is limited and entire magnetic flux cannot be returned to the S pole of the magnet, because a portion of the magnetic pole piece of the second stator yoke 6 is positioned at the boundary of the N and S poles of the magnet. Further, the effective interlinkage magnetic flux and thus the motor efficiency are reduced, because the magnetic flux passing through the center yokes 7 is interlinkaged with the annular winding.

FIG. 7 is a graph showing relations between the interlinkage magnetic flux of the motor winding and the counter electromotive force with respect to the motor revolution, in case that the materials and figure of the center yoke are varied. In FIG. 7, a curve ① shows the counter electromotive force in case that an electromagnetic soft iron is used, and ④ shows the interlinkage magnetic flux. The frequency of the alternating magnetic flux passing through the center yoke becomes high and the interlinkage magnetic flux is suppressed by the eddy current according to the increase of the rotation, so that the counter electromotive force is saturated. In FIG. 7, a curve ② shows the counter electromotive force and ⑤ shows the interlinkage magnetic flux in case that one slit 17 is formed axially in each of the center yokes 7 as shown in FIG. 8. By the effect of the reduction of the eddy current, the counter electromotive force and the interlinkage magnetic flux are improved in the high speed rotation region, however, the interlinkage magnetic flux is reduced in the low speed rotation range. Further, if the slit is formed in the center yoke, the precision of the outer dimension of the center yoke is lowered.

In the Japanese Patent Laid-Open No. 303750/94, the spread angle c of the magnetic pole piece 22 of the second stator yoke 6 is smaller than the spread angle a of the magnetic pole piece 21 of the first stator yoke 5, as shown in FIG. 9 of the present application, so that the width of the magnetic pole piece 22 becomes small, the effective interlinkage magnetic flux of the motor is reduced, and the motor efficiency is also reduced.

In the Japanese Patent Laid-Open No. 63050/83, the area of the magnetic pole piece is reduced and the effective interlinkage magnetic flux is also reduced, because the projecting portions 20 is provided on the magnetic pole pieces 21 and 22, as shown in FIG. 12 of the present application. Further, in such DC motor, there is such a fear that the magnetic flux passing through the electromagnetic steel plate of each of stator yokes is saturated, because the thickness of the electromagnetic steel plate is limited in most cases. The magnetic flux from the magnet 3 is passed through the tip end of the magnetic pole piece to the main magnet pole, and the density of the magnetic flux is large, so that there is a possibility of saturation of the magnetic flux if the passage of the magnetic flux is narrowed.

When an electric current is passed through the annular winding, not only the rotary force is generated between the projecting portions 20 of the magnetic pole pieces 21 and 22 and the magnet 3, but also the attractive force and the repulsive force directed to the stator yoke are generated, so that the magnetic pole pieces are oscillated. If the width of the connecting portion of the main magnetic pole 13 and the magnetic pole piece 21, as well as the width of the connecting portion of the main magnetic pole 14 and the magnetic pole piece 22 are small, the oscillation becomes large and thus the noise is increased.

It is preferable that the wind passage area is increased and the motor revolution number is reduced as much as possible in order to maintain the large quantity of wind, to increase the efficiency and to reduce the noise in the small fan•blower. FIG. 13 is a perspective view of a small fan motor. A reference numeral 50 denotes a fan case and 51 denotes blades provided on the rotor yoke 2. In FIG. 13, it is preferable that the outer diameter of the rotor yoke 2 of the brushless DC motor positioned at the center of the fan is reduced to a value lower than 55% of the outer diameter of the blade 51, in order to increase the quantity of the suction wind.

However, in the small motor having the annular winding as shown in FIG. 10, the thickness of the bobbin 23 used for winding of the winding 24 and the insulation thereof is larger than about 0.5 mm. Accordingly, the space of the winding 24 is reduced by the thickness of the bobbin 23. For example, in case of a motor wherein the outer diameter A is about 18 mm and the length D of the stator yoke is about 15 mm, the space factor of the winding becomes lower than 80%, and the output and the efficiency of the motor are reduced. Further, the diameter of the motor cannot be reduced, because the space for the bobbin 23 is necessary. As a result, the blade of the fan•blower becomes small and the efficiency is lowered. Further, the noise due to the motor oscillation is increased if the motor input is increased in order to increase the quantity of wind of the fan•blower.

The winding 24 itself is heated by the electric current passing through the winding 24 when the motor is driven. In general, the bobbin 23 is formed of the resin and thus the heat conductivity is small, so that the heat radiation from the stator yokes 5 and 6 is small, the temperature of the motor is increased, and the life time of the bearing of the fan•blower is shortened.

SUMMARY OF THE INVENTION

An object of the present invention is to solve the above technical problems.

Another object of the present invention is to provide a small motor of a high efficiency suitable for use in the small fan•blower, wherein the number of the parts is reduced, the cost is reduced remarkably by improving the treatment of the lead wires of the winding, the reduction of the effective interlinkage magnetic flux of the motor is prevented, and the oscillation of the magnetic pole piece is prevented.

A further object of the present invention is to provide a brushless DC motor, wherein a winding assembly is composed of an annular winding, an electromagnetic conversion element, and a driving circuit mounted on a printed wiring board; main magnetic poles of a first stator yoke is deviated by about 180° in electrical angle from main magnetic poles of a second stator yoke; both end surfaces of the winding assembly are held by the main magnetic poles of the first and second stator yokes; an outer peripheral surface of the annular winding is covered with magnetic pole pieces of the first and second stator yokes; and a center yoke is positioned at the center of the winding assembly.

The annular winding is an air-core winding and formed of two normally tight wound self welding wires, each wire having an adhesive film around an insulating coating thereof, the winding being energized by two-phase half-wave electric currents having a phase difference of 180° in electrical angle.

The printed wiring board is flexible.

At least one of the first and second stator yokes is movable in the axial direction thereof so as to meet with a change of the length of the annular winding.

At least one of the magnetic pole pieces of the first and second stator yokes has a cutout portion so as to reduce gradually an area of the magnetic pole piece toward the tip end thereof.

The center yoke is made of a soft magnetic stainless steel comprising 10–15 wt % of chrome and 85–90 wt % of iron.

Still further object of the present invention is to provide a brushlees DC motor, wherein two sets of stator yokes are coated with thin insulating films, and an annular winding formed of self welding wires is inserted into a space formed between the center yoke and the magnetic pole pieces without forming any gap substantially therebetween, so that the space factor of the winding becomes near 100%.

The stator yokes and the annular winding are impregnated with a liquid insulating material and connected each other so as to increase the heat radiation of the annular winding.

A thin insulating sheet instead of the thin insulating coating for the first and second stator yokes is used.

Yet further object of the present invention is to provide a brushless DC motor for use in a driving source of a small fan•blower in order to increase the efficiency remarkably and reduce the noise.

These and other aspects and objects of the present invention will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

DESCRIPTION OF THE PREFERRED EMBODIMENTS

Figure 1:
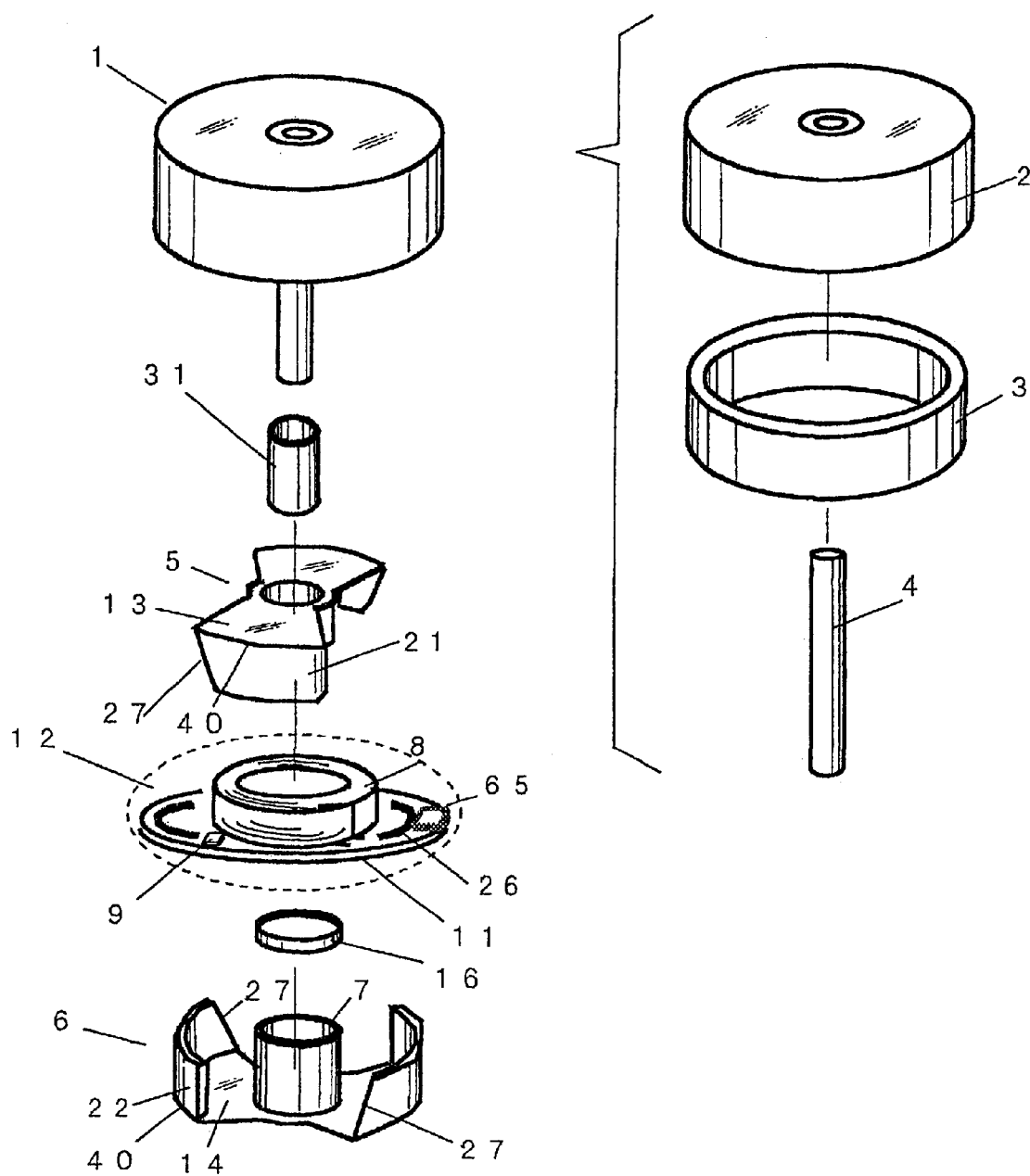
FIG. 1 is an exploded view of a brushless DC motor of a first embodiment according to the present invention.

A brushless DC motor of a first embodiment according to the present invention will be explained. Parts of the motor which are similar to corresponding parts of the conventional motor shown in FIG. 8 to FIG. 12 have been given corresponding reference numerals and need not be further redescribed. As shown in FIG. 1, electric parts 65 and a Hall element 9 used as an electromagnetic conversion element are mounted on a printed wiring board 11, an air-core annular winding 8 having no bobbin is fixed on the printed wiring board 11, and lead wires of the winding 8 are connected directly by soldering on the printed wiring board 11 to form a winding assembly 12.

A first stator yoke 5 comprising two planar main magnetic poles 13 extending radially outwardly from the center thereof, and two magnetic pole pieces 21 extending axially from the tip ends of the main magnetic poles 13 is provided. A second stator yoke 6 comprising two planar main magnetic poles 14 extending radially outwardly from the center thereof, and two magnetic pole pieces 22 extending axially from tip ends of the main magnet poles 14 is provided. A center yoke 7 is provided at the center of each of the first and second stator yokes 5 and 6 and inserted into the center hole of the winding assembly 12.

The first stator yoke 5 is arranged so as to deviate by 180° in electrical angle from the second stator yoke 6. The winding assembly 12 is held by the first and second stator yokes 5 and 6.

In the first embodiment of the present invention, a rotor 1 formed of a rotor yoke 2, a magnet 3 magnetized so as to have a plurality of magnet poles in the circumferential direction thereof, and a shaft 4 is combined with the winding assembly 12, so as to form a brushless DC motor.

According to the first embodiment of the present invention, the wiring of the electric circuit is completed before the motor is assembled, so that the test of the circuit operation can be carried out before the motor is assembled and thus the operation efficiency is increased. Further, a bobbin 23 for the winding and a terminal can be omitted, so that the cost of parts can be reduced.

In this first embodiment of the present invention, the air-core bifilar annular winding 8 is formed by forwarding two self welding wires in parallel at the same time. According to this embodiment, the space factor of the winding is increased because the winding is formed by the substantial normal winding, and it is possible to increase the motor efficiency.

Figure 6:
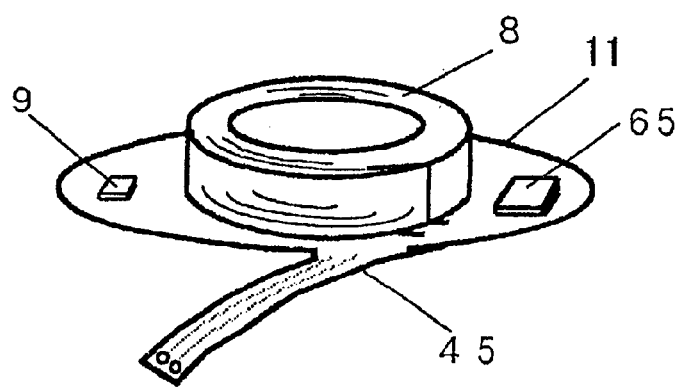
FIG. 6 is a perspective view of a winding assembly of the brushless DC motor of the first embodiment according to the present invention.

FIG. 6 shows the winding assembly 12 of the present invention. A flexible printed wiring board 11 small in thickness is used in order to increase a space for the winding 24, so that the space factor and the motor efficiency are increased. A portion 45 is projected from the outer peripheral surface of the board 11 for holding lead wires to be connected to the power source or the like outside of the motor.

Figure 2:
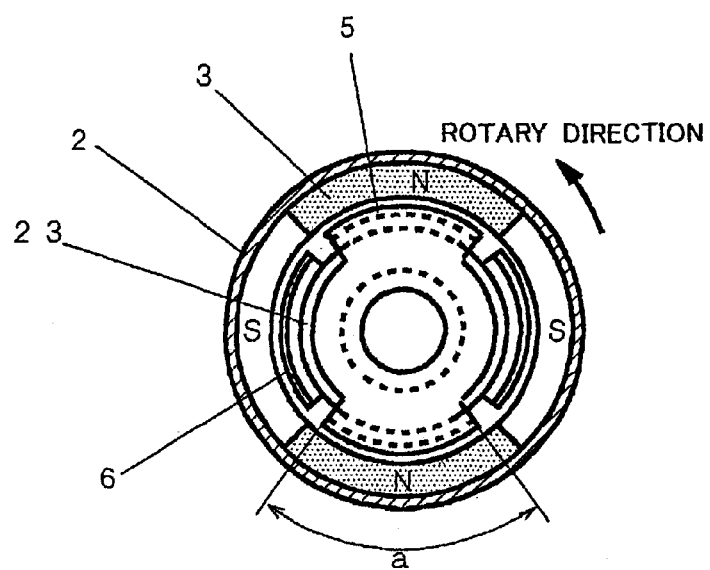
FIG. 2 is a horizontally sectional view of the brushless DC motor of the first embodiment according to the present invention showing a relation between a magnet and stator yokes thereof.

As shown in FIG. 1, a cutout portion 27 is formed at one side edge of each of the magnetic pole pieces 21 and 22 so as to reduce gradually the surface area of each of the magnetic pole pieces 21 and 22 toward a tip end thereof. In FIG. 2, the stator yokes 5 and 6 are deviated by 180° in electrical angle from each other. A spread angle a of each of the magnetic pole pieces 21 and 22 is $7/10$ to $9/10$ of that of one magnet pole of the magnet 3.

As shown in FIG. 2, a magnetic flux from the N pole of the magnet 3 is returned to the S pole of the magnet 3 through the first stator yoke 5, the center yokes 7 and the second stator yoke 6. According to the motor of the present invention, the current of the magnetic flux is not limited and it is possible to increase the effective interlinkage magnetic flux of the motor, because the spread angle a of the magnetic pole piece can be increased and the each of the magnetic pole pieces can be arranged in the same angular position with the magnet 3, on the contrary to the conventional motor.

The motor wherein the magnet poles of the magnet 3 and the stator yokes 5 and 6 are positioned as shown in FIG. 2 has a dead point, at which the motor cannot be started. However, the motor of the present invention has no such dead point, because the cogging torque generating position is shifted by the presence of the cutout portion 27.

Further, the cutout portion 27 is not formed on a connecting portion 40 of the main magnetic pole and the magnetic pole piece, so that a force against the radial direction of the stator yoke is not reduced, and the oscillation of the stator yoke is not increased.

Figure 3:
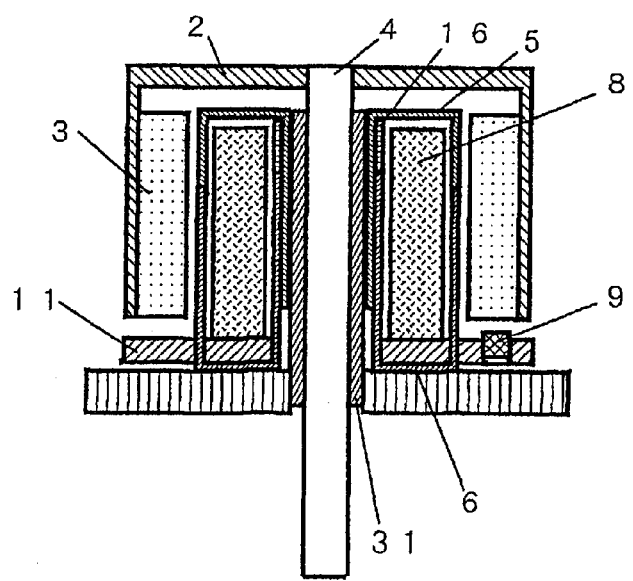
FIG. 3 is a vertically sectional view of the brushless DC motor of the first embodiment according to the present invention.

According to the first embodiment of the present invention, as shown in FIG. 3, center portions of the first and second stator yokes 5 and 6 are drawn to form tubes, so that the tubes are fitted telescopically each other to form the center yokes 7 for connecting magnetically the first and second stator yokes 5 and 6. A ring spacer 16 is inserted between the first and second stator yokes 5 and 6.

Figure 10:
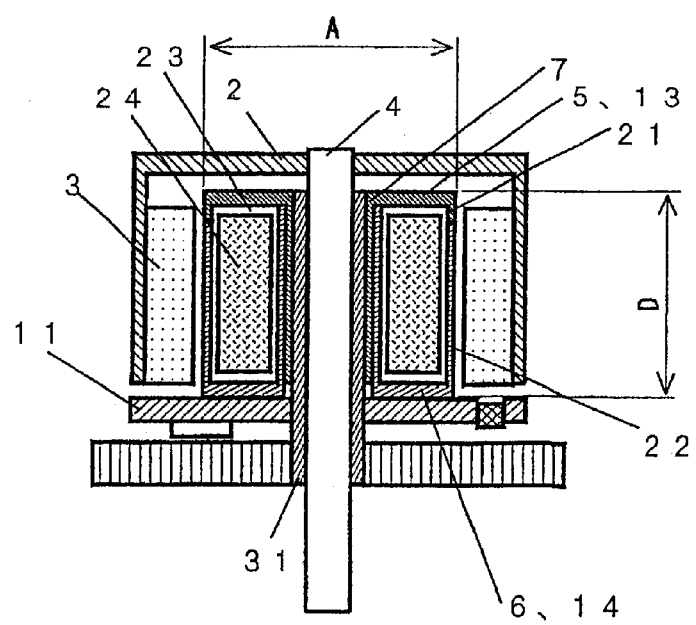
FIG. 10 is a vertically sectional view of the conventional brushless DC motor.
Figure 11:
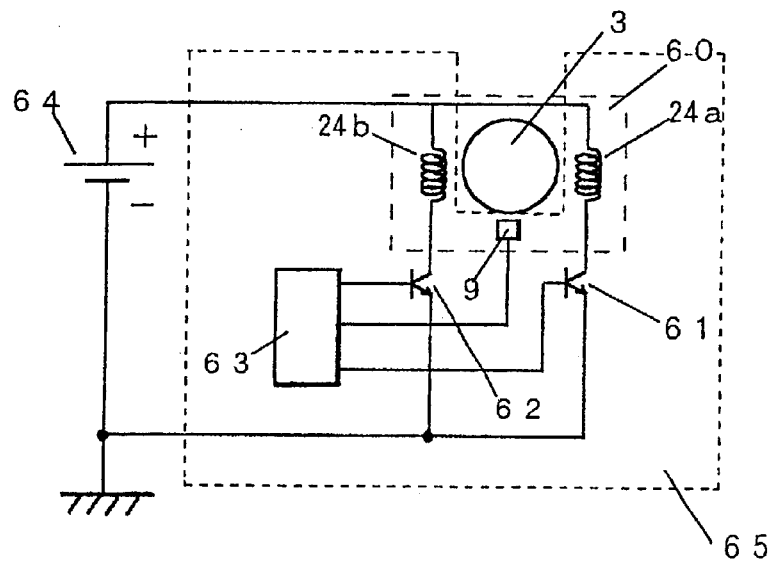
FIG. 11 shows a driving circuit of the conventional brushless DC motor.
Figure 12:
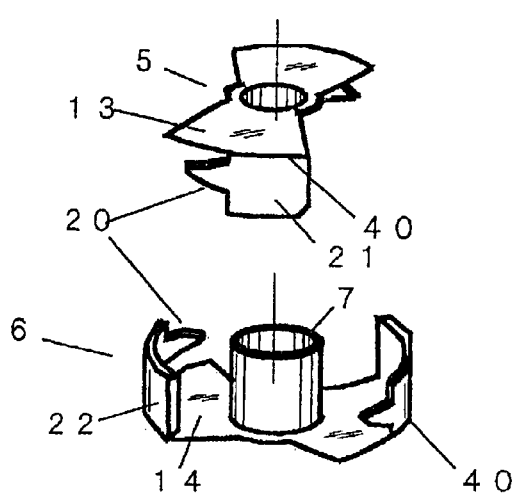
FIG. 12 is an exploded view of the stator yokes of the conventional brushless DC motor.
Figure 13:
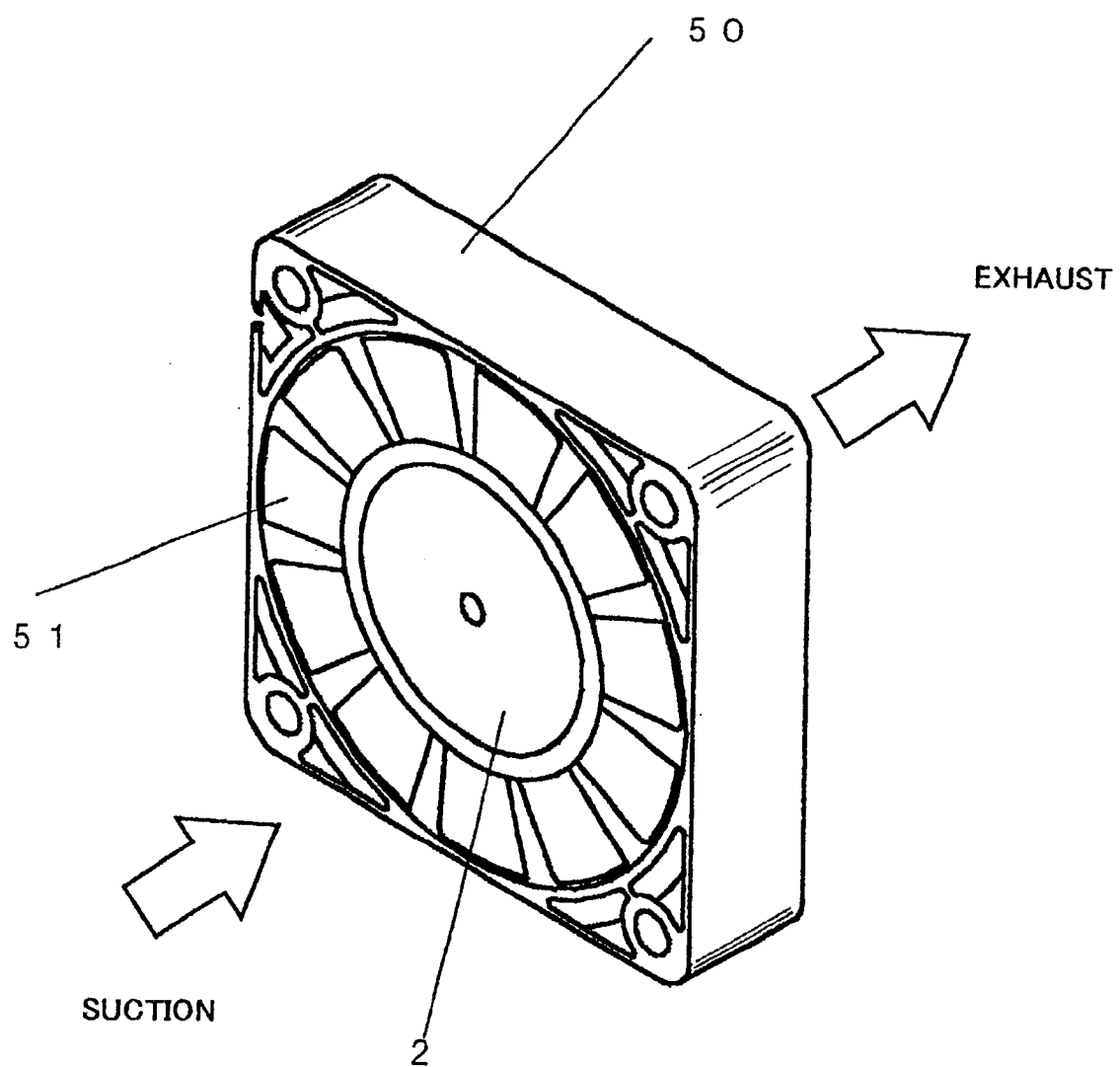
FIG. 13 is a perspective view of a small fan using the motor according to the present invention.

The brushless DC motor of the present invention shown in FIG. 3 will be compared with the conventional brushless DC motor shown in FIG. 10 hereunder.

According to the present invention, the axial lengths of the annular winding 8 and the magnet 3 can be extended by the inserted ring spacer 16, so that the ampereturn and thus the motor power can be increased.

Figure 7:
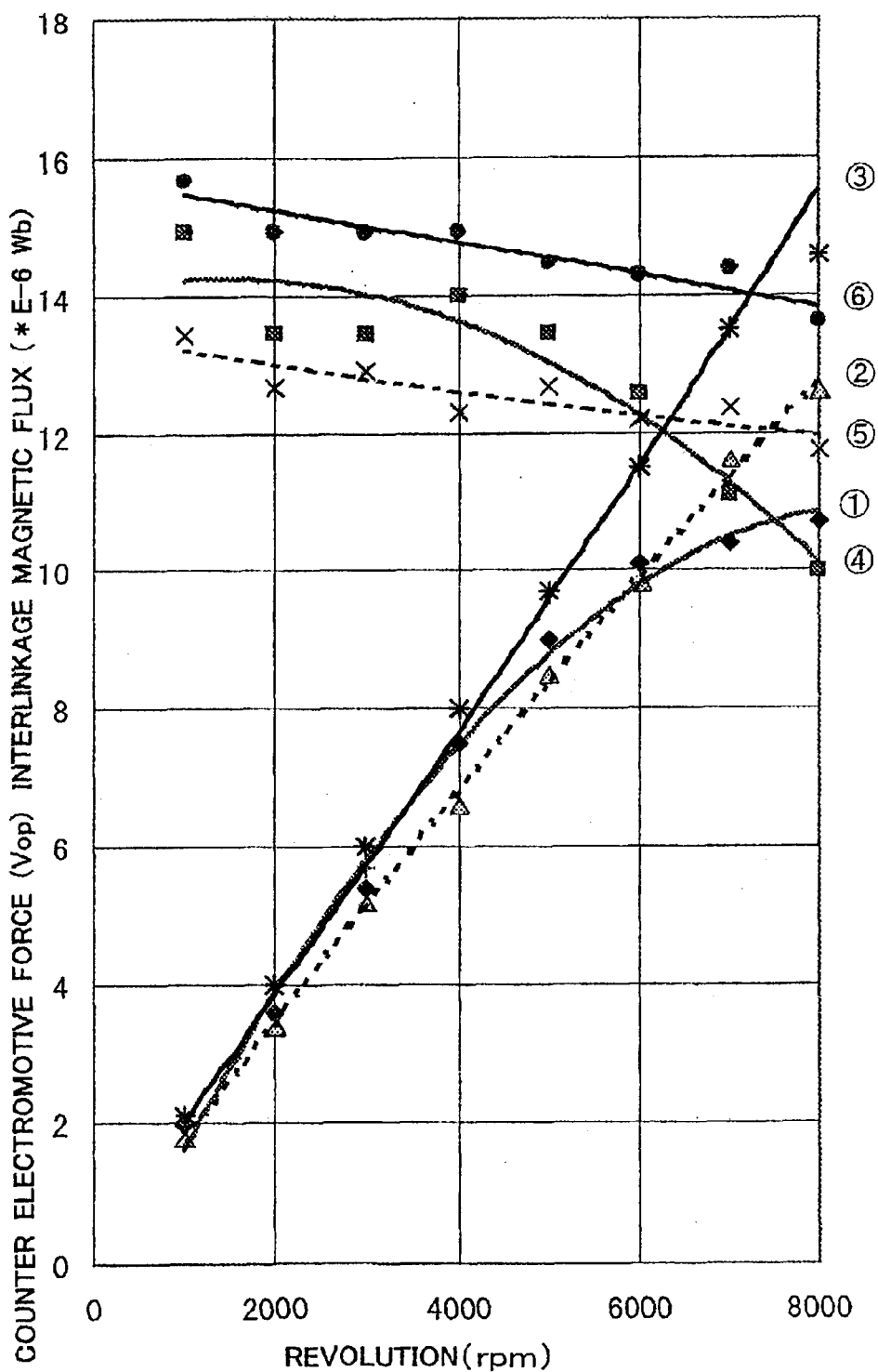
FIG. 7 is a graph showing a specific properties of the brushless DC motor according to the present invention.
Figure 8:
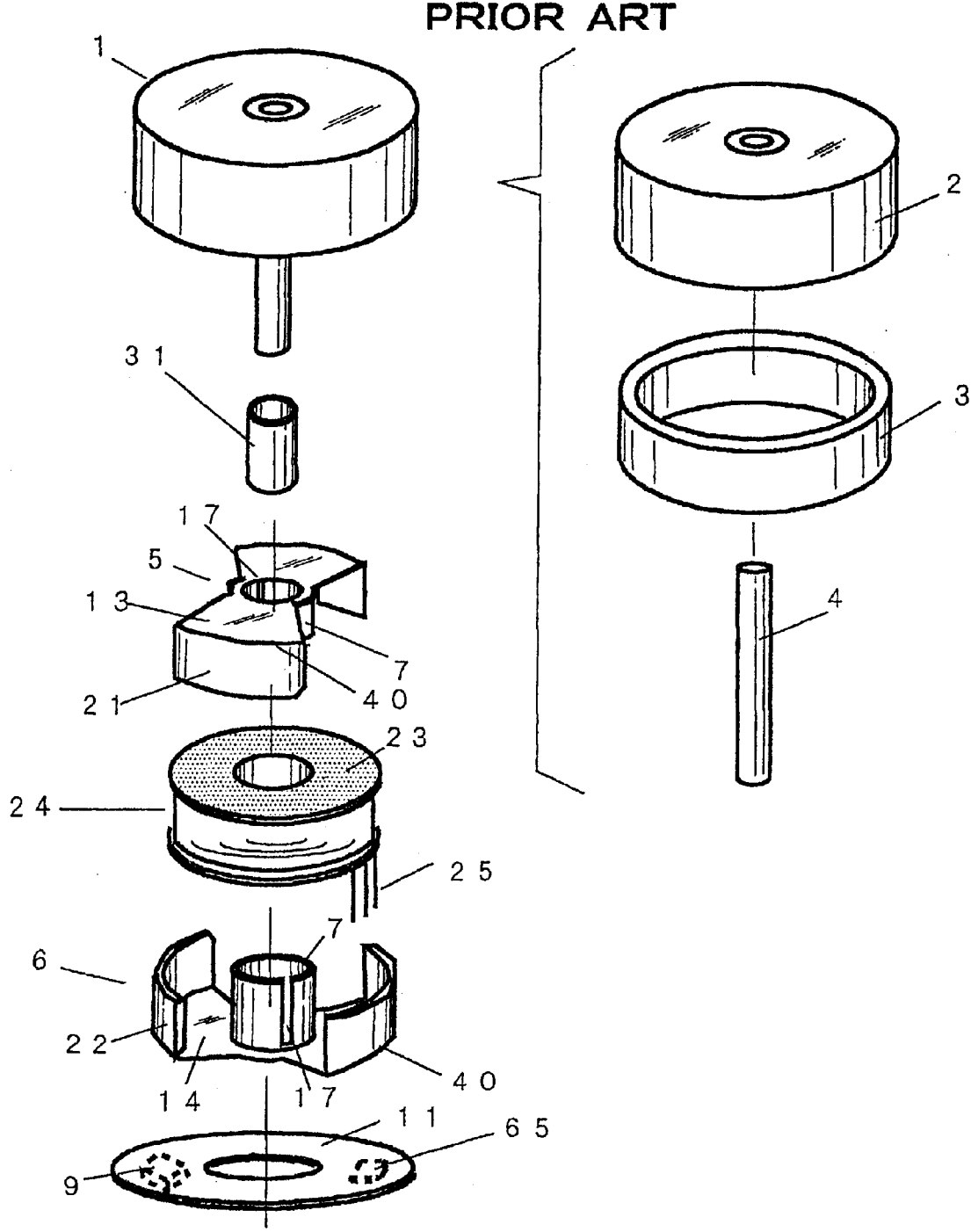
FIG. 8 is an exploded view of the conventional brushless CD motor.
Figure 9:
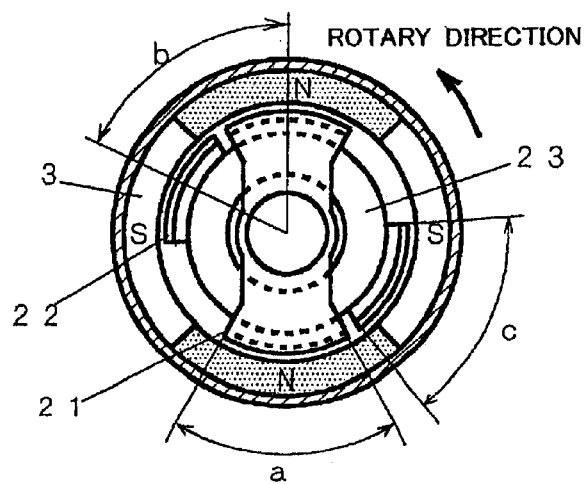
FIG. 9 is a horizontally sectional view of the conventional brushless DC motor showing a relation between the magnet and the stator yokes thereof.

FIG. 7 shows a line ③ of a counter electromotive force and a line ⑥ of an interlinkage magnetic flux in case that the center yoke 7 is made of a soft magnetic stainless steel plate comprising 10–15 wt % of chrome and 85–90 wt % of iron. The electric resistivity of the soft magnetic stainless steel plate is 6300 ($\mu\Omega$·m), whereas the electric resistivity of the standard electromagnetic soft iron is 1400 ($\mu\Omega$·m). Accordingly, as shown in FIG. 7, the properties of the counter electromotive force and the interlinkage magnetic flux are enhanced in the entire range of rotation from the low speed to the high speed.

Figure 4:
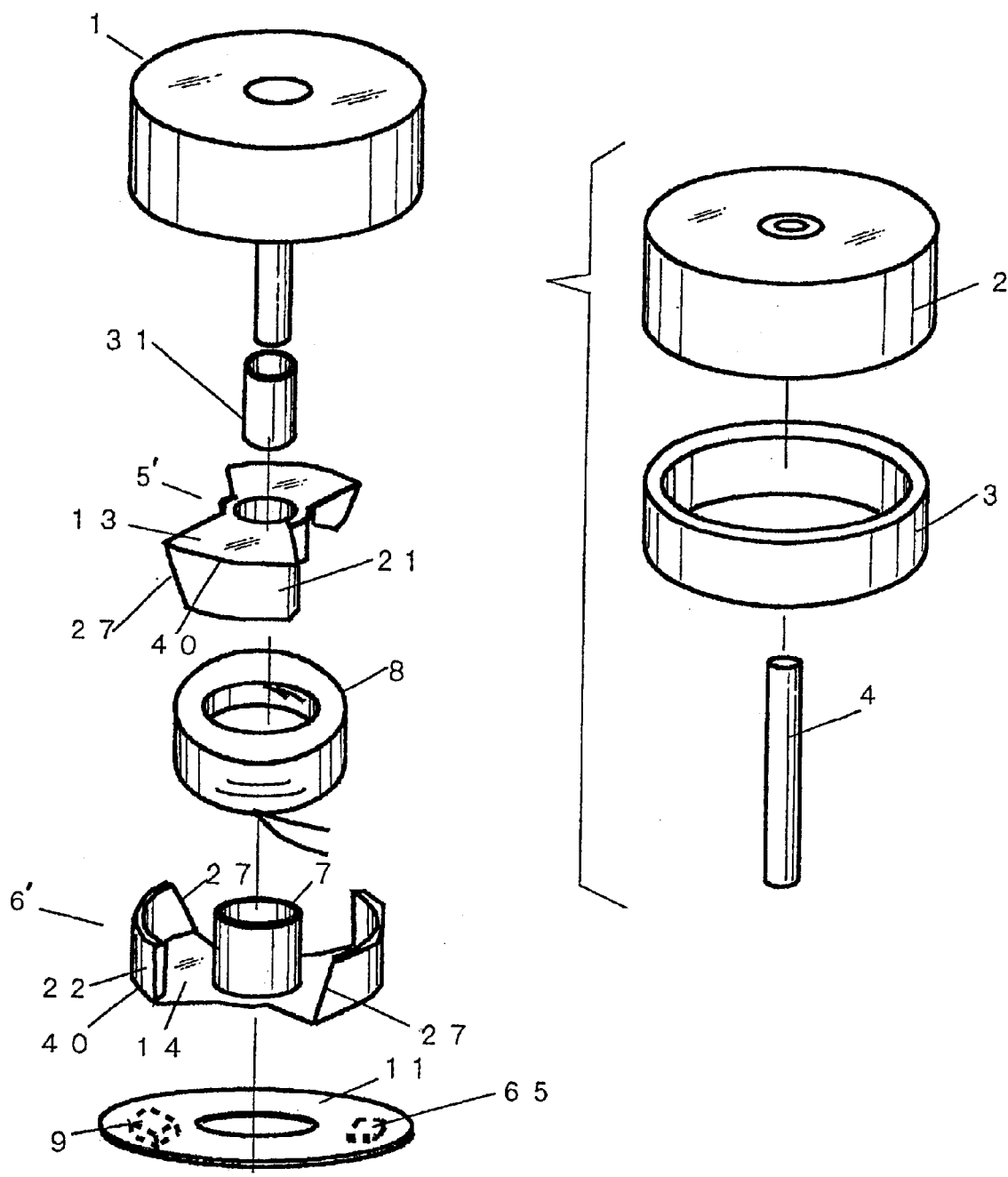
FIG. 4 is an exploded view of a brushless DC motor of a second embodiment according to the present invention.
Figure 5:
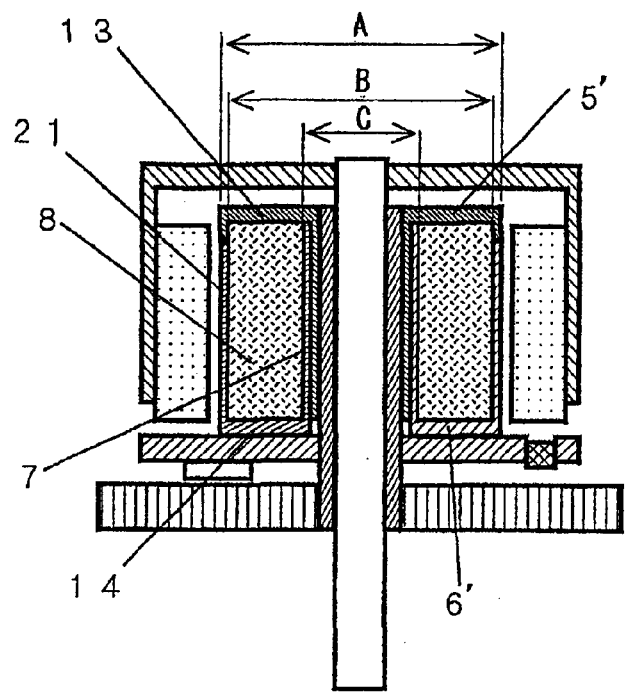
FIG. 5 is a vertically sectional view of the brushless DC motor of the second embodiment according to the present invention.

FIG. 4 shows a second embodiment of the present invention. In the second embodiment, a first stator yoke 5' comprising two planar main magnetic poles 13 extending radially outwardly from the center thereof, and two magnetic pole pieces 21 extending axially from the tip ends of the main magnetic poles 13 is provided, and a second stator yoke 6' comprising two planar main magnetic poles 14 extending radially outwardly from the center thereof, and two magnetic pole pieces 22 extending axially from tip ends of the main magnet poles 14 is provided. A center yoke 7 is provided at the center of each of the first and second stator yokes 5' and 6' and inserted into the center hole of an annular air-core winding 8.

The first stator yoke 5' is arranged so as to deviate by 180° in electrical angle from the second stator yoke 6'. The first and second stator yokes 5' and 6' are covered with thin insulating films. The winding 8 is held by the first and second stator yokes 5' and 6'.

In the second embodiment of the present invention, a rotor 1 formed of a rotor yoke 2, a magnet 3 magnetized so as to have a plurality of magnet poles in the circumferential direction thereof, and a shaft 4 is combined with the winding 8, so as to form a brushless DC motor.

A printed wiring board 11, on which a Hall element 9 used as an electromagnetic conversion element and electric parts 65 for a driving circuit are installed, is attached on the back surface of the second stator yoke 6'. Lead wires of the winding 8 are soldered on the printed wiring board 11.

It is recognized by the test and the analysis of the electromagnetic field that a conventional system wherein the stator yoke is formed by laminating stator yoke elements is equal in effective interlinkage magnetic flux of winding to a conventional system wherein an annular winding is used. Further, in the annular winding system, the path of the magnetic flux becomes long, so that the iron loss becomes large. However, it is possible to reduce the iron loss by selecting the material of the stator yokes 5' and 6', and the processing manner. The constant of the counter electromotive force relating to the property of the motor is determined by the products of the effective interlinkage magnetic flux of winding, the number of magnet poles and the number of turns of the winding. This number of turns of the winding affects on the property of the motor to a large extent, if the effective interlinkage magnetic flux of winding and the number of magnet poles are constant. Accordingly, the number of turns of the winding can be increased by increasing the space factor of the winding, so that it is possible to increase the efficiency of the motor of the annular winding system.

In general, the space factor of the winding is small in case of the small motor. The space factor of the conventional motor having the laminated stator yoke for use in the small fan is 50% to 60%, and the space factor of the conventional motor having the annular winding wound around the bobbin is 70% to 80%, for example. In the motor of the second embodiment according to the present invention, the outer diameter A of the magnetic pole pieces of the stator yoke is 18 mm, outer diameter B and the inner diameter C of the annular air-core winding 8 are 17 mm and 10.5 mm, respectively. The inner diameter C of the annular air-core winding 8 having no bobbin is so determined that the center yoke can be fitted into the winding 8 without forming any gap therebetween. Further, the stator yoke is coated with a thin insulating paint of about 20 $\mu$m in thickness by the cation electrodeposition. According to such motor, it is possible to increase the space factor to 95% or more.

The efficiency of the conventional motor having the laminated stator yoke is 25%, and the efficiency of the convention motor having annular winding is 32%. On the contrary thereto, in the present invention, it is possible to increase the efficiency of the motor to 42% under the same outer diameter of the motor.

According to the present invention, further, it is possible to make smaller in outer diameter of the rotor yoke 2 than that of the conventional motor having the annular winding under the same output property of the motor. Accordingly, in the present invention, the outer diameter of the fan blade 51 can be increased, so that the quantity of suction air of the fan and the efficiency of the fan can be increased. Further, the revolution number of the motor can be reduced under the same quantity of air, because the quantity of suction air is large, so that the noise of the motor can be reduced.

In the conventional motor having the annular winding, the winding is formed by using the bobbin of the synthetic resin, so that the heat conductivity of the winding is small in spite of the fact that the winding is self heated by the electric current passing therethrough. On the contrary thereto, in the present invention, the winding 24 is contacted intimately substantially with the stator yokes 5 and 6, so that the heat conductivity and the heat radiating effect of the winding 24 are large and it is possible to suppress the elevation of the temperature of the winding. Further, the two stator yokes 5' and 6' and the annular winding 8 are impregnated with the varnish and hardened, so that the heat radiating effect is increased.

It goes without saying that the similar effect can be obtained by inserting a thin insulating sheet instead of coating the two stator yokes 5' and 6' with the thin insulating films.

The effects of the brushless DC motor of the first embodiment according to the present invention are summarized as follows.

1. The bobbin and the terminals to which the lead wires of the winding are tied up can be omitted, so that the material cost can be reduced.

2. The wiring of the electric parts and the winding can easily be carried out on the printed wiring board, so that operation efficiency is increased.

3. The winding is formed by normal winding and the space factor is increased remarkably compared with the conventional bifilar winding using the bobbin, so that the motor efficiency is increased.

4. By using the flexible thin printed wiring board, the winding space and the space factor are increased, so that the motor efficiency is increased. A portion of the flexible board can be used for holding lead wires to the outside of the motor.

5. The full length of the motor can be varied in a certain range without changing the metal mold for making the stator yoke, so that it is possible to accommodate easily the motor to the change of the motor output.

6. The spread angle of the magnetic pole piece can be increased, so that the effective interlinkage magnetic flux of winding can be increased.

7. The magnetic pole piece of the first stator yoke can be arranged so as to deviate by 180° in electrical angle from the magnetic pole piece of the second stator yoke, so that the effective interlinkage magnetic flux of winding can be increased.

8. The reduction of the area of the magnetic pole piece can be minimized and the magnetic saturation can be prevented, so that effective interlinkage magnetic flux of winding can be increased.

9. The area of the magnetic passage is not reduced, so that the effective interlinkage magnetic flux of winding can be increased.

10. The oscillation of the motor can be suppressed by increasing the supporting area for the magnetic pole piece.

11. The center yoke is formed of the soft magnetic stainless steel plate, so that the effective interlinkage magnetic flux of winding can be increased in the high speed rotation region.

The effects of the brushless DC motor of the second embodiment according to the present invention are summarized as follows.

12. The annular winding can be positioned without any gap in the space formed by the two stator yokes, so that the space factor of the winding can be increased near to 100%, and the small motor of high efficiency can be obtained.

13. The diameter of the motor can be reduced, because the space factor of the winding is near 100%, so that a large quantity of air flow can be obtained if the above motor is used for the fan•blower.

14. It is possible to reduce the motor revolution number under the same quantity of air flow, so that the oscillation of the motor and the noise of the fan•blower can be reduced remarkably, because the space factor of the winding is near 100%.

15. It is possible to suppress the elevation of the temperature of the winding even if the winding is self heated by the electric current passing therethrough, because the winding is contacted intimately substantially with the stator yoke and the heat radiating effect is large.

16. The two stator yokes and the annular winding are impregnated with the varnish and hardened, so that the heat radiating effect is increased and the oscillations of the annular winding and the magnetic pole pieces are prevented effectively.

17. By using the above motor reduced in diameter in the small fan•blower, the efficiency of the fan•blower can be increased, and the noise can be suppressed remarkably.

While the invention has been particularly shown and described with reference to the preferred embodiments thereof, it will be understood by those skilled in the art that various changes in form and details may be made therein without departing from the spirit and scope of the invention as defined by the appended claims.

What is claimed is:

1. A brushless DC motor comprising:
   a rotor having a motor shaft, a rotor yoke mounted on the motor shaft, and a ring-shaped magnet magnefoed so as to have a plurality of magnet poles in the circumferential direction thereof, and held by the rotor yoke;
   first and second stator yokes, each having main magnetic poles extending in the radial direction from the center thereof, the number of the main magnetic poles being a half of the number of the magnet poles of the magnet, and magnetic pole pieces extending in the vertical direction from tip ends of the main magnetic poles along an inner peripheral surface of the ring-shaped magnet;
   a center yoke surrounding the motor shaft via a bearing and passing through the center portions of said first and second stator yokes for connecting magnetically said first and second stator yokes;
   a winding assembly having first and second opposed end surfaces and including an air-core annular winding, an electromagnetic conversion element, and a driving circuit; and
   a printed wiring board on which the annular winding, the electromagnetic conversion element and the driving circuit are mounted;
   wherein the main magnetic poles of the first stator yoke is deviated by about 180° in electrical angle from the main magnetic poles of the second stator yoke,
   wherein the first and second end surfaces of the winding assembly are held by the main magnetic poles of the first and second stator yokes, respectively,
   wherein an outer peripheral surface of the annular winding is covered with the magnetic pole pieces of the first and second stator yokes,
   wherein the center yoke is passed through the center hole of the annular winding, and
   wherein the printed wiring board has through holes through which the magnetic pole pieces of the second stator yoke are passed.

2. A brushless DC motor comprising:
   a rotor having a motor shaft, a rotor yoke mounted on the motor shaft, and a ring-shaped magnet magnetized so as to have a plurality of magnet poles in the circumferential direction thereof, and held by the rotor yoke;
   first and second stator yokes, each having main magnetic poles extending in the radial direction from the center thereof, the number of the main magnetic poles being a half of the number of the magnet poles of the magnet, and magnetic pole pieces extending in the vertical direction from tip ends of the main magnetic poles along an inner peripheral surface of the ring-shaped magnet;
   a center yoke surrounding the motor shaft via a bearing and passing through the center portions of said first and second stator yokes for connecting magnetically said first and second stator yokes;
   a winding assembly having first and second opposed end surfaces and including an air-core annular winding, an electromagnetic conversion element, and a driving circuit; and a printed wiring board on which the annular winding, the electromagnetic conversion element and the driving circuit are mounted;

wherein the main magnetic poles of the first stator yoke is deviated by about 180° in electrical angle from the main magnetic poles of the second stator yoke, wherein the first and second end surfaces of the winding assembly are held by the main magnetic poles of the first and second stator yokes, respectively, wherein an outer peripheral surface of the annular winding is coveted with the magnetic pole pieces of the first and second stator yokes, wherein the center yoke is passed through the center hole of the annular winding, wherein at least one of the opposed end surfaces of the winding assembly directly faces the main magnetic poles of the respective stator yoke without any other motor component being disposed therebetween, and wherein the printed wiring board is disposed between one of the opposed end surfaces of the winding assembly and the magnetic poles of the respective stator yoke and the other of the opposed end surfaces of the winding assembly faces the main magnetic poles of the respective stator yoke without any other motor component being disposed therebetween.

3. A brushless DC motor comprising:

a rotor having a motor shaft, a rotor yoke mounted on the motor shaft, and a ring-shaped magnet which is held by the rotor yoke and which is magnetized so as to have a plurality of magnet poles in a circumferential direction thereof;

first and second stator yokes, each having 1) main magnetic poles extending in a radial direction from a center thereof, the number of the main magnetic poles being half of the number of the magnet poles of the magnet, and 2) magnetic pole pieces extending in a vertical direction from tip ends of the main magnetic poles along an inner peripheral surface of the ring-shaped magnet;

a center yoke surrounding the motor shaft via a bearing and passing through the center portions of said first and second stator yokes so as to magnetically connect said first and second stator yokes to one another;

a bobbin-less winding assembly having first and second opposed end surfaces and including an air-core annular winding, an electromagnetic conversion element, and a driving circuit; and a printed wiring board on which the annular winding, the electromagnetic conversion element and the driving circuit are mounted;

wherein the main magnetic poles of the first stator yoke is deviated by about 180° in electrical angle from the main magnetic poles of the second stator yoke, wherein the first and second end surfaces of the winding assembly are held by the main magnetic poles of the first and second stator yokes, respectively, such that at least one of the opposed end surfaces of the winding assembly directly faces the main magnetic poles of the respective stator yoke without any other motor component being disposed therebetween, wherein an outer peripheral surface of the annular winding is covered with the magnetic pole pieces of the first and second stator yokes, and wherein the center yoke extends through a center hole of the annular winding.

4. The brushless DC motor as claimed in claim 3, wherein the printed wiring board is disposed between one of the opposed end surfaces of the winding assembly and the magnetic poles of the respective stator yoke and the other of the opposed end surfaces of the winding assembly faces the main magnetic poles of the respective stator yoke without any other motor component being disposed therebetween.

5. The brushless DC motor as claimed in claim 3, wherein both of the opposed end surfaces of the winding assembly directly face the main magnetic poles of the respective stator yokes without any other motor components being disposed therebetween.

6. The brushless DC motor as claimed in claim 5, wherein the printed wiring board is attached to a back surface of one of the stator yokes.

* * * * *